July 17, 1956 — O. J. POUPITCH — 2,754,872
CAM ACTUATED BITING TOOTH NUT LOCKING MEANS
Filed Jan. 12, 1953 — 2 Sheets-Sheet 1
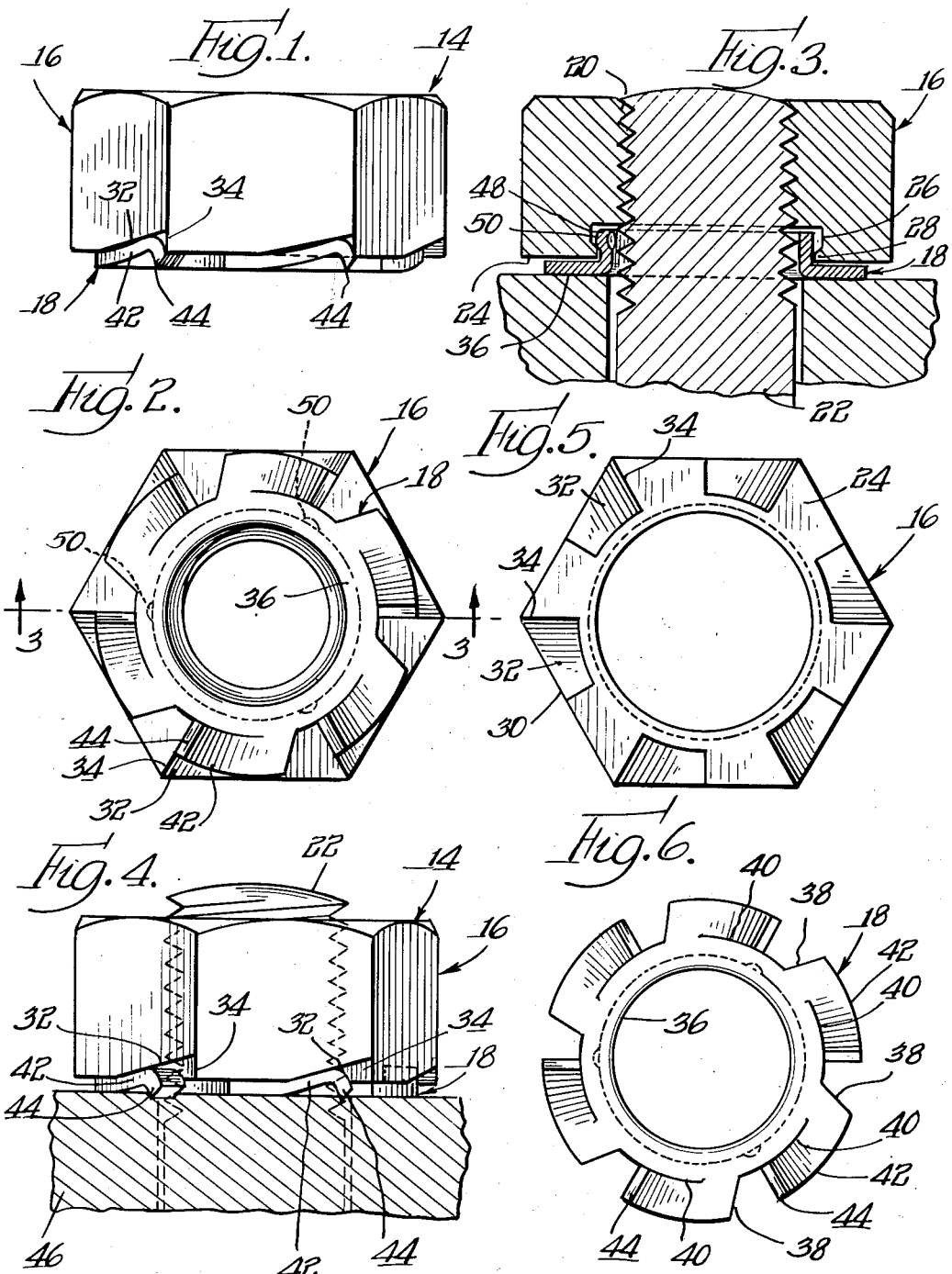

July 17, 1956     O. J. POUPITCH     2,754,872
CAM ACTUATED BITING TOOTH NUT LOCKING MEANS
Filed Jan. 12, 1953     2 Sheets-Sheet 2
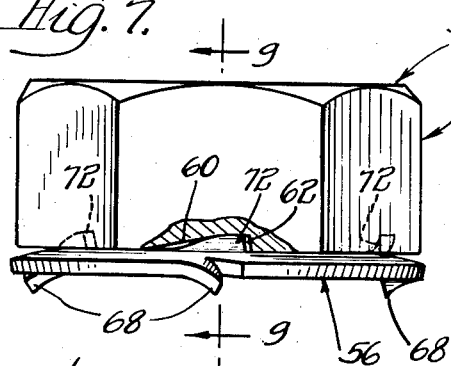
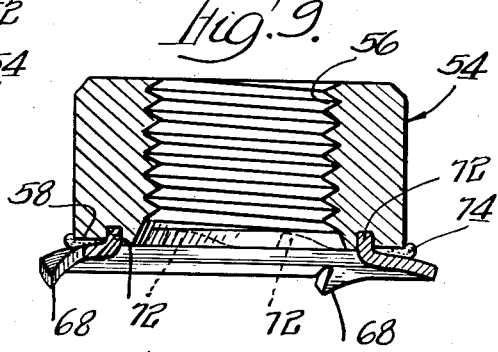
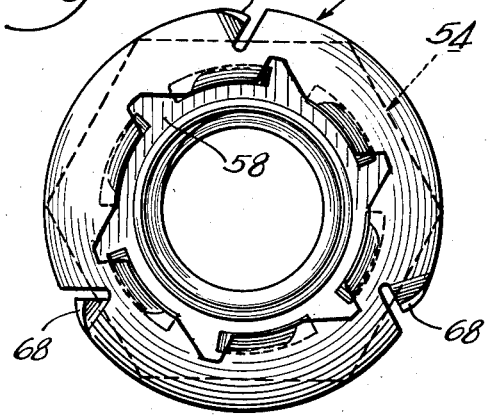
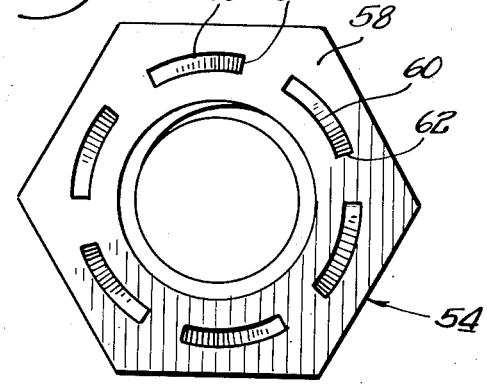
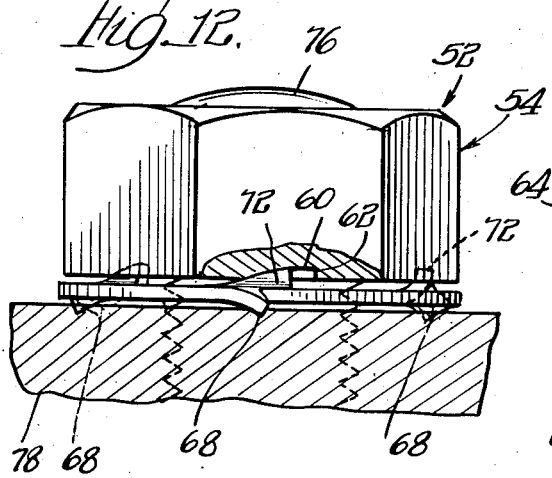
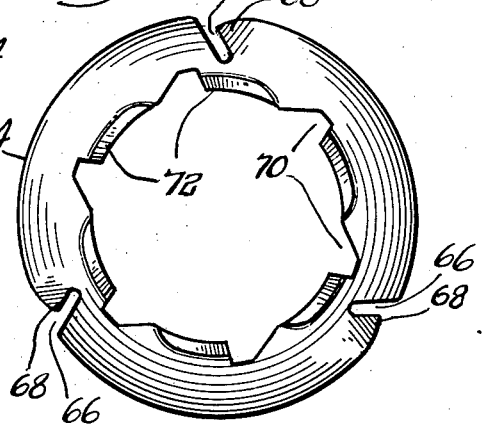
INVENTOR.
Ougljesa Jules Poupitch
BY
Moore, Olson & Trexler
Attys.

United States Patent Office 2,754,872
Patented July 17, 1956

2,754,872

CAM ACTUATED BITING TOOTH NUT LOCKING MEANS

Ougljesa Jules Poupitch, Itasca, Ill., assignor to Illinois Tool Works, Chicago, Ill., a corporation of Illinois Application January 12, 1953, Serial No. 330,737

3 Claims. (Cl. 151—37)

The present invention relates to a novel rotary fastener assembly, and more particularly to a novel nut or screw and a tooth lock washer assembly.

An object of the present invention is to provide a novel preassembled tooth lock washer and nut or screw assembly which may be relatively easily turned to a fastened position and which is constructed in a manner so that the holding power of the unit is increased upon any tendency of the nut or screw to rotate relative to the washer.

A more specific object of the present invention is to provide a novel rotary fastener unit of the above described type, wherein means is provided for causing the teeth of the lock washer to dig into the surface of a work piece with increased pressure upon any tendency of the nut or screw to rotate relative to the washer.

Another object of the present invention is to provide a novel unit of the above described type of simple construction, whereby the unit may be readily and economically manufactured.

Other objects and advantages of the present invention will become apparent from the following description and the accompanying drawings, wherein:

Fig. 1 is a side elevational view of a novel rotary fastener unit embodying the principles of this invention;

Fig. 2 is a bottom view of the fastener unit shown in Fig. 1;

Fig. 3 is a vertical cross sectional view taken along line 3—3 in Fig. 2 and showing the unit secured against a work piece;

Fig. 4 is a side elevational view showing a novel rotary fastener unit of this invention secured against a work piece;

Fig. 5 is a bottom view of the nut of the fastener unit of Figs. 1 through 4;

Fig. 6 is a bottom view of the lock washer of the fastener unit of Figs. 1 through 4;

Fig. 7 is a side elevational view showing a novel fastener unit embodying a modified form of this invention;

Fig. 8 is a bottom view of the fastener unit shown in Fig. 7;

Fig. 9 is a vertical cross sectional view taken along line 9—9 in Fig. 7;

Fig. 10 is a bottom view of the nut of the fastener unit of Figs. 7 through 9;

Fig. 11 is a bottom view of the lock washer of the novel fastener unit of Figs. 7 through 9; and Fig. 12 shows the novel fastener unit of Figs. 7 through 9 secured against a work piece.

Referring more specifically to the drawings, wherein like parts are designated by the same numerals throughout the various figures, a rotary fastener unit 14 embodying the principles of this invention is shown best in Figs. 1 and 4. The unit 14 includes a nut 16 and a lock washer 18.

The nut 16 includes a central threaded aperture 20 adapted threadedly to receive a complementary threaded fastener element, such as a stud or screw 22. The nut is provided with a work facing and clamping surface 24 extending radially outwardly from the threaded aperture 20. Adjacent the work facing surface 24, the aperture 20 is enlarged, as at 26, and provided with an annular radially inwardly directed shoulder 28 for a purpose described more fully below. As shown best in Figs. 2 and 5, the nut 16 may have the conventional hexagonal shape. It is, of course, understood that the principles of this invention may be applied to nuts having other shapes. As shown best in Figs. 1, 4, and 5, the radially extending work facing surface 24 of the nut is recessed at a plurality of points around the circumference thereof, as at 30. As shown best in Figs. 1 and 4, these recesses are formed so that they include a cam surface 32 inclined upwardly from the work facing surface 24 of the nut at an acute angle to the axis of the nut and a stop surface 34 disposed in a plane generally parallel to the axis of the nut. As shown best in Fig. 5, these stop surfaces or shoulders 34 are disposed so that they extend generally radially from the axis of the nut and intersect the corners of the hexagonal nut. By positioning the recesses in the manner illustrated, a larger area of the surface 24 of the nut may be worked upon to provide ease of manufacture.

The novel lock washer of this invention includes an annular body section 36 having a plurality of cutaway portions 38 about the periphery thereof. The body of the washer is slit, as at 40, to provide fingers 42. As shown best in Figs. 1 and 4, the fingers 42 are formed so that they extend upwardly from the annular body section 36 and thence are bent relatively sharply downwardly to provide a work piece engaging tooth portion 44. It should be noted that the tooth portion 44 is disposed at an angle to the body section 36 of the washer so that a relatively sharp edge of the tooth portion is presented for engagement with a work piece 46.

As shown best in Fig. 3, the lock washer 38 has an inner marginal portion formed to provide a tubular sleeve 48 adapted to be inserted within the enlarged portion 26 of the central bore of the nut. A plurality of protuberance means 50 are deformed outwardly from the sleeve portion 48 of the washer for engagement with the annular shoulder 28 to retain the washer in preassembled relationship with the nut.

With the fastener unit 14 in assembled relationship, as shown in Figs. 1, 2, and 4, it is seen that the upwardly inclined portions of the fingers 42 of the lock washers seat within the recesses 32 formed in the face of the nut and that the tooth portions 44 of the fingers extend axially outwardly of the surface 24 of the nut for engagement with the work piece. When using the rotary fastener unit 14 of this invention, the unit is turned down on the stud or screw 22 until the tooth portions 44 of the lock washer engage the surface of the work piece 46. Continued rotation of the nut causes the nut to rotate relative to the washer until the stop surfaces or shoulders 34 engage the tooth portions 44 of the lock washer fingers. After such engagement, the lock washer rotates with the nut, and the fingers 44 are caused to dig into and grip the surface of the work piece 46. If for any reason the nut inadvertently tends to become loosened by a backward rotation relative to the lock washer, the high or axially outer portions of the cam surfaces 32 on the nut attempt to ride up the cam surface provided by the inclined portion of the lock washer fingers. This action causes the pressure to be increased between the nut and the lock washer, and particularly between the teeth of the lock washer and the work piece, thereby effectively restraining the fastener unit from becoming inadvertently loosened. It is important to note that the cam surfaces 32 on the nut and the cam surfaces provided by the lock washer fingers are inclined to the axis of the fastener unit at an angle greater than the lead angle of the threads of the nut. This structure prevents the nut from moving axially away from the work surface before said above mentioned increased pressure becomes effective to restrain the nut.

Referring now to Figs. 7 through 12, wherein there is shown a fastener unit 52 embodying a modified form of the present invention and comprising a nut 54 and a lock washer 56. Referring particularly to Figs. 9 and 10, it is seen that the nut 54 includes a central threaded bore 56 and a radially extending work facing surface 58. A plurality of recesses having cam surfaces 60 and stop surfaces or shoulders 62 are formed in the work facing surface 58 of the nut. The cam surface 60 and stop surfaces 62 of the recess are formed in substantially the same manner as the above described cam surfaces 32 and stop surfaces 34 of the nut 16, except that in this embodiment, the surfaces 60 and 62 are formed toward an inner marginal portion of the work facing surface rather than at the outer marginal portion of the work facing surface.

The lock washer 56 comprises an annular body section 64 of generally concavo-convex shape and preferably formed of spring steel. Slots 66 are cut in the periphery of the body section 64, as illustrated best in Fig. 11. It should be noted that the slots 66 are cut at an angle to provide pointed corner portions which are bent outwardly or axially away from the concave side of the washer to provide teeth 68. Notches 70 are cut about the inner marginal portion of the annular body section 64, and the portions of the body section between these notches are bent axially outwardly from the convex side of the body section to provide cams 72, as shown best in Figs. 7, 9, and 12. In the embodiment disclosed in Figs. 7 through 12, the nut 54 has been provided with six recesses with cam surfaces 60, and, correspondingly, the washer has been provided with six cam elements 72 adapted to cooperate with the cam surfaces on the nut. However, in this embodiment, the washer has been formed with only three locking teeth 68. It should be understood, however, that the number of locking teeth and cam elements can be changed without departing from the principles of this invention.

The nut 54 and the lock washer 56 may be held together if desired to provide a preassembled unit by means of a suitable well known adhesive 74, as shown in Fig. 9. The adhesive 74 should have weak shear properties so that when the unit is applied to a complementary screw or stud 76 and secured against a work piece 78, as shown in Fig. 12, the adhesive will shear to permit relative rotation between the washer and the nut. The operation of the fastener unit 52 is substantially the same as the above described operation of the fastener unit 14, and, therefore, need not be described in detail. It is understood, of course, that the surfaces of the cam elements 72 and the cam surfaces 60 on the nut 54 are inclined to the axis of the nut at an angle greater than the lead angle of the threads. In addition, it is understood that the stop surfaces or shoulders 62 on the nut will engage the ends of the cam element 72 while the unit is being tightened against the work piece so that the washer 56 will rotate with the nut.

From the above description, it is seen that the present invention has provided a novel rotary fastener assembly which may be tightened against a work piece and held in position by predetermined pressure causing locking of the washer relative to the work piece and of the nut relative to the washer and which is constructed so that the locking pressure is materially increased upon any tendency of the nut to rotate relative to the lock washer by reason of the cooperation between the cam surfaces of the nut and washer. Furthermore, it is seen that the present invention has provided a novel fastener assembly fully capable of performing its intended function and which is of simple construction so that it may be easily and economically manufactured.

While the preferred embodiment of the present invention has been described and shown herein, it is obvious that many changes may be made without departing from the spirit and scope of the appended claims. It is especially clear that the principles of this invention may be equally well applied to screw and washer assemblies, as well as nut and washer assemblies, in cases where the screws include a head or other means providing a radially extending work facing surface for cooperation with the cam surfaces on the washer.

I claim:

1. A preassembled rotary fastener unit comprising a rotary threaded fastener member having a clamping surface extending radially outwardly from the threaded portion of the fastener, an annular lock washer of sheet material disposed adjacent said clamping surface, means retaining said rotary fastener member and lock washer in preassembled relation but permitting relative rotation therebetween, the clamping side of the rotary fastener having a plurality of circumferentially spaced and concentrically disposed recesses, each recess being of varying depth and defined by a bottom cam surface inclined in the same direction as but at a slightly greater angle than the thread convolutions of the rotary fastener and an abutment surface extending substantially axially from the trailing extremity of said cam surface, said lock washer having a plurality of circumferentially spaced locking prongs deflected axially from the washer stock, each of said prongs nesting within one of said recesses with its outer surface lying adjacent the cam surface defining said recess, the free extremities of said prongs positioned adjacent the trailing extremity of its complementary cam surface and abutment surface, and a section of the free extremity of each prong being deflected axially to provide locking teeth positioned adjacent a complementary abutment surface and projecting axially beyond the clamping side of the rotary fastener, whereby upon any tendency for the rotary fastener to experience retrograde rotation after the washer teeth have been tightened against a work surface, said cam surfaces will coact with the adjacent surfaces of the prongs to increase the locking aggressiveness of the teeth against the work surface and thus counteract further tendency to loosen, all of said prongs and locking teeth being located within the outer circumferential confines of the rotary clamping surface.

2. A preassembled rotary fastener unit as set forth in claim 1, wherein the circumferentially spaced and concentrically disposed recesses of varying depth are positioned along the outer margin and intersect the peripheral wall portions of the fastener.

3. A preassembled rotary fastener unit as set forth in claim 1, wherein the lock washer is provided with an internal annular retainer flange, and the rotary threaded fastener is provided with a counterbore for accommodating said flange.

References Cited in the file of this patent

UNITED STATES PATENTS

| 122,676 | Stouffer | Jan. 9, 1872 |
| 743,822 | Bryan | Nov. 10, 1903 |
| 907,473 | De Tray | Dec. 22, 1908 |
| 1,874,462 | Crowther | Aug. 30, 1932 |
| 1,911,384 | Olson | May 30, 1933 |
| 2,541,096 | Poupitch | Feb. 13, 1951 |
| 2,576,906 | Poupitch | Nov. 27, 1951 |
| 2,619,146 | Poupitch | Nov. 25, 1952 |

FOREIGN PATENTS

| 1,370 of 1915 | Great Britain | Jan. 27, 1915 |